United States Patent
Joly-Pottuz et al.

(10) Patent No.: US 8,118,461 B2
(45) Date of Patent: Feb. 21, 2012

(54) FRONT UNIT FOR A MOTOR VEHICLE

(75) Inventors: Pascal Joly-Pottuz, Lenting (DE); Raphael Mary, Stammham (DE); Yann Clapie, Stammham (DE)

(73) Assignee: Faurecia Kunststoffe Automobilsysteme GmbH, Ingolstadt (DE)

( * ) Notice: Subject to any disclaimer, the term of this patent is extended or adjusted under 35 U.S.C. 154(b) by 411 days.

(21) Appl. No.: 12/050,693

(22) Filed: Mar. 18, 2008

(65) Prior Publication Data

US 2009/0196065 A1    Aug. 6, 2009

(30) Foreign Application Priority Data

Feb. 5, 2008  (DE) .................. 10 2008 000 238

(51) Int. Cl.
*B60Q 1/00* (2006.01)
*F21V 19/02* (2006.01)

(52) U.S. Cl. ......... 362/505; 362/506; 362/507; 362/523
(58) Field of Classification Search .......... 362/505–507, 362/523
See application file for complete search history.

(56) References Cited

U.S. PATENT DOCUMENTS

| 6,523,886 | B2 | 2/2003 | Hoffner |
| 2002/0117875 | A1* | 8/2002 | Hoffner et al. ............. 296/194 |
| 2005/0270790 | A1 | 12/2005 | Kreutzberg |
| 2006/0250899 | A1* | 11/2006 | Clapie .......................... 369/1 |

FOREIGN PATENT DOCUMENTS

| DE | 102004026881 A1 | 2/1992 |
| DE | 19946995 A1 | 9/1998 |
| DE | 19741522 A1 | 3/1999 |
| DE | 60000006 T2 | 3/2002 |
| DE | 20314383 U1 | 12/2003 |
| DE | 102005013107 B3 | 7/2006 |
| DE | 102005053423 A1 | 5/2007 |
| DE | 102006008240 A1 | 8/2007 |
| EP | 1036730 A2 | 9/2000 |
| EP | 1232932 A1 | 8/2002 |
| FR | 2809061 A1 | 5/2000 |
| JP | 2002144951 | 5/2002 |
| WO | WO2006/024717 | * 3/2006 |

* cited by examiner

*Primary Examiner* — William Carter
(74) *Attorney, Agent, or Firm* — Matthew B. Dernier, Esq.; Gibson & Dernier, LLP (57) ABSTRACT

The invention concerns a front unit for a motor vehicle with at least one headlight unit, a mounting component for connecting with the motor vehicle, means for hanging the headlight unit to the mounting component, an elastic element with first a fastener for fastening relative to the mounting component and a second fastener for fastening to a first side of the headlight unit, positioning means for positioning a second side of the headlight unit located opposite the first side relative to a fender area of the motor vehicle.

17 Claims, 5 Drawing Sheets

FRONT UNIT FOR A MOTOR VEHICLE

BACKGROUND

The invention concerns a front unit for a motor vehicle, a procedure for preassembly of a front unit, and a procedure for assembly of a front unit on a motor vehicle.

Various front units and assembly procedures for front units are already known from the state of the art.

EP 1 232 932 A1 shows a carrier for the front unit of a motor vehicle with a mounting component for connecting to the fenders and the chassis of the motor vehicle (see also mounting components 7 and 13 in FIGS. 1 and 2 of EP 1 232 932 A1). Fastened to the mounting component is a holding component for receiving a headlight unit and for connecting to a bumper (see also in this regard holding component 43, headlight unit 21, bumper 19 and guide 45 for fastening the holding component to the mounting component, as depicted in the figures of EP 1 232 932 A1).

With respect to the state of the art known from EP 1 232 932 A1, the problem arises that based on the relatively large dimensional tolerance of the body shell of a motor vehicle body, on which the front unit is to be mounted, fitting problems can occur during assembly. Because of this, the so-called joint pattern, in particular with respect to the joints between the bumper and the headlight unit and between the headlight unit and the engine hood, as well as between the bumper and the engine hood, can be compromised.

Other similar front units have become known from FR 2 809 061, DE 199 46 995 A1, DE 197 41 522, DE 10 2006 008 240, DE 10 2005 053 423, DE 10 2004 026 881, DE 203 14 383, and JP 2002 144 951.

Furthermore, a front assembly for a vehicle with a support structure and a headlight is known from DE 600 00 006 T2, wherein the headlight is rotatably mounted to the support structure between a preassembled and an end-assembled position around an inclined axle.

A procedure for the precise-tolerance assembly of components of a motor vehicle front end is known from EP 1 036 730 A2. A multitude of tolerances which influence one another can be considered here.

A carrier for the front unit of a motor vehicle and an assembly procedure are known from DE 10 2005 013 107 B3, which the invention assumes to be the next version of the state of the art. The holding components for receiving the headlight units are each connected to a mounting component via elastic elements, wherein a compensatory tolerance is created by the elastic elements. The disadvantage here is that the holding components are needed to hold the headlight units, since these holding components must be sized so that they can hold the weight of the headlight units even if the load situation changes without quivering of the headlights, which requires a correspondingly large installation space.

SUMMARY OF THE INVENTION

The task which forms the basis of the invention is to create an improved front unit for a motor vehicle, an improved procedure for preassembly of a front unit and an improved procedure for assembly of a front unit on a motor vehicle.

According to the embodiments of the invention, a front unit for a motor vehicle is created. The front unit has at least one headlight unit, typically a left and a right headlight unit. A mounting component of the front unit is used to fasten the front unit to the motor vehicle body shell, for example to a chassis of the motor vehicle, in particular the longitudinal members of the motor vehicle.

The front unit has instruments for hanging the headlight units on the mounting component. This has the particular advantage in that the mounting component can accept the weight of the headlight units, so that no separate supportive holding components are required for the headlight units. The alignment of a headlight unit relative to the motor vehicle body shell is carried out using an elastic element and positioning instruments. The elastic element has the initial fasteners for fastening it relative to the mounting component of the front unit. For example, the initial fasteners can be designed for fastening the elastic element directly to the mounting component or another fixed structural part of the front unit. The elastic element also has a second fastener for fastening it to the first side of the headlight unit. The first side of the headlight unit is preferably the internal side of the headlight unit.

The positioning instruments are used to position a second side of the headlight unit relative to one of the fenders of the motor vehicle. The second side of the headlight unit is situated opposite the first side, e.g. the second side could pertain to the external side of the headlight unit.

In one embodiment of the invention, the instruments for hanging a headlight unit to the mounting component are designed so that the headlight unit can be moved and/or rotated relative to the mounting component, at least when the front unit is in a preassembled state. For example, the front unit is conveyed to the motor vehicle body shell in a preassembled state. The mounting component of the front unit is then tightly connected to the motor vehicle body shell. The headlight unit is then aligned relative to one of the fender areas of the motor vehicle with the aid of a positioning instrument, which is possible because of the loose attachment to the mounting component. After alignment of the headlight unit, it is fixed in its assumed position. This can be a result of fixing the elastic element in its assumed form based on the positioning of the headlight unit.

In one embodiment of the invention, the elastic element is designed like a parallelogram. The parallelogram formed by the elastic element has two parallelogram sides, which essentially run in vehicle-X direction, e.g. in the direction of travel, and two parallelogram sides which essentially run in vehicle-Z direction, e.g. vertically.

In one embodiment of the invention, the second fasteners are arranged on one of the parallelogram sides, preferably on the upper of the parallelogram sides essentially running in X-direction.

In one embodiment of the invention, the positioning instruments feature at least one positioning peg. The one minimum positioning peg can be arranged on the second side of the headlight unit. In particular, the one minimum positioning peg can be arranged on an edge of the diffusing lens of the headlight unit or together with the headlight unit, form a structural unit. For example, the diffusing lens can be manufactured with the one minimum positioning peg as a unique plastic-injection molding.

In one embodiment of the invention, the front unit has a separate positioning component. During preassembly of the front unit, the positioning component can be detachably connected to the second side of the headlight unit. During assembly of the front unit, the positioning component is detached from the headlight unit and mounted in a fender area of the vehicle, perhaps bolted down. The headlight unit is then aligned relative to the fender area with the aid of the minimum of one positioning peg, which is arranged on the positioning component.

In one embodiment of the invention, the front unit has a holding component for a bumper cover. The elastic media have third fasteners for the holding component. The holding component is mounted on the front unit, for example by being aligned with the aid of the positioning instruments and connected to the elastic media in the position it has thereby assumed.

In one embodiment of the invention, the holding component has an opening into which the positioning peg of the positioning instruments can be inserted to align the holding component.

In one embodiment of the invention, the elastic element has fourth fasteners for attaching the bumper cover. The fourth fasteners are preferably located in the X-direction of the motor vehicle in front of the second fasteners, so that the second fasteners are still accessible after installation of the bumper cover. This ensures that the headlight unit is easy to disassemble, so as to repair it, in particular, to replace lamps, or to change the headlight unit.

In one embodiment of the invention, the elastic element has instruments for fixing in its deformation position assumed by the positioning of the headlight. This can be fifth fasteners for fastening a free end of the elastic medium relative to the mounting component.

In another aspect, the invention concerns a procedure for preassembly of a front unit with the following steps: fastening the elastic element on the first side of the headlight unit with the aid of the second instrument for attaching, hanging the headlight unit on the mounting component with the aid of the instrument for hanging, wherein the hanger assembly allows for movement and/or rotation of the headlight unit relative to the mounting component.

In another aspect, the invention concerns a procedure for assembly of a front unit on a motor vehicle with the following steps: attachment of the mounting component on the motor vehicle, positioning of the headlight unit with the aid of the positioning instruments relative to the fender of the vehicle, attachment of the elastic element relative to the mounting component.

BRIEF DESCRIPTION OF THE DRAWING

Embodiments of the invention with reference to the drawings will be described in more detail below. The following are shown.

DETAILED DESCRIPTION OF THE INVENTION

Elements of the following embodiments that correspond to one another are identified with the same reference marks.

Figure 1:
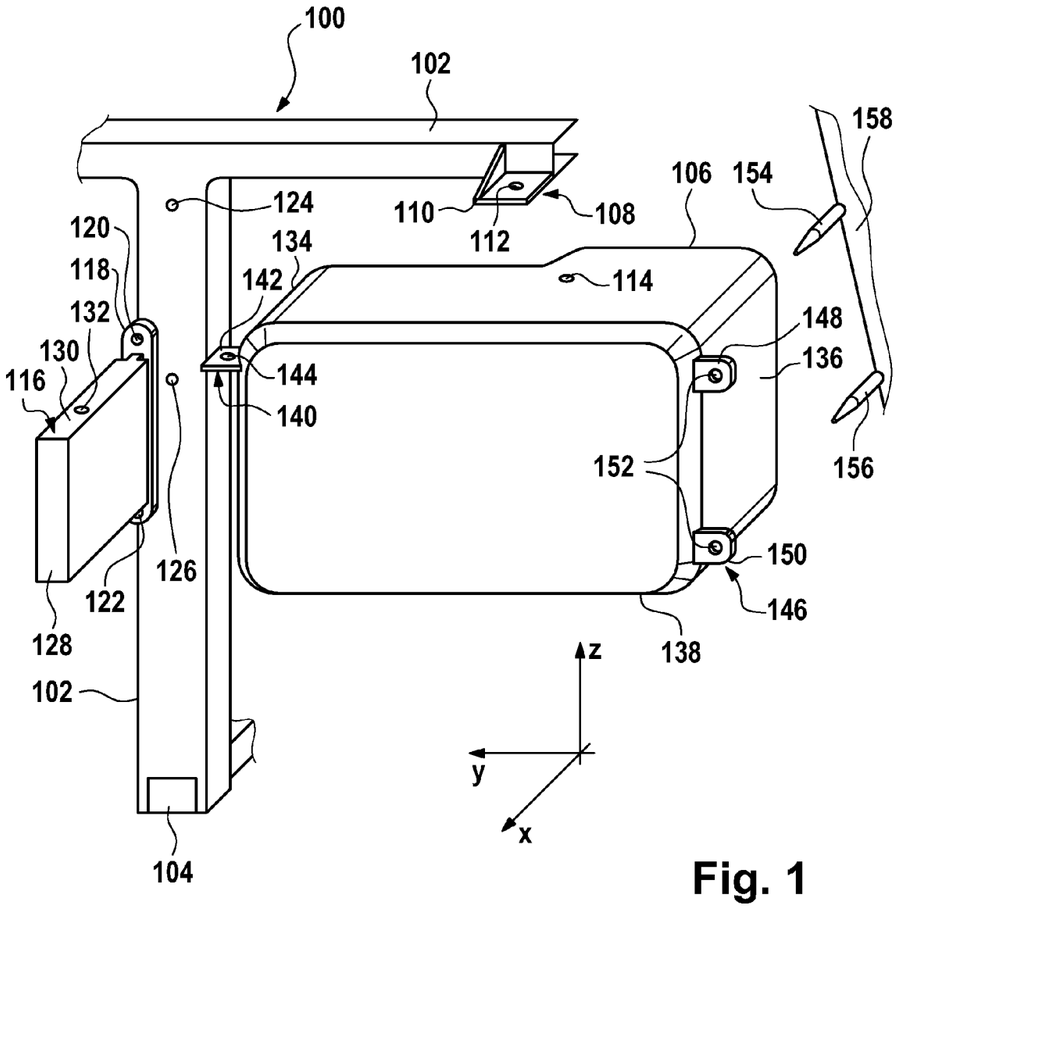
FIG. 1 is a perspective view of an embodiment of a front unit according to the invention.

FIG. 1 shows a perspective partial view of a left side of a front unit 100 for a motor vehicle. Front unit 100 has a mounting component for attaching front unit 100 to the vehicle body shell of the motor vehicle. For example, mounting component 102 can be attached to longitudinal members 104 of the motor vehicle, one of which is depicted in FIG. 1.

A left headlight unit 106 of front unit 100 can be attached to mounting component 102. To this end, a hanger assembly 108 is arranged on a section of mounting component 102 running essentially in Y-direction. In the embodiment under consideration here, this consists of a projection 110 with an opening 112 for receiving a fastener, such as a bolt. An internal screw thread 114 is formed in the housing of headlight unit 106. If internal screw thread 114 is positioned below opening 112, then the bolt can be inserted through opening 112 into internal screw thread 114, in order to hang headlight unit 106 on mounting component 102. During preassembly of headlight unit 106, it is preferable not to tighten down the bolt, so that headlight unit 106 can be rotated around the axis defined by the bolt.

Opening 112 can have a diameter that is several millimeters larger than the bolt or it can be an elongated hole, so as to also allow for headlight unit 106 to be moved relative to mounting component 102 after headlight unit 106 has been preassembled.

In place of projection 110, opening 112 can also run directly through the profile of mounting component 102, which makes projection 110 superfluous.

In place of a screw connection, another type of attachment can also be selected, such as a snap-in connection, a fastening clip or the like.

Front unit 100 has an elastic element 116 with initial fasteners 118 for fastening elastic element 116 relative to mounting component 102. Fastener 118 can be designed like a socket, for example, as depicted in FIG. 1. The socket formed by fastener 118 has two openings 120 and 122, through each of which a bolt can be guided in order to screw the bolts into the respective internal screw threads, which can be formed in the section of mounting component 102 which runs essentially in Z-direction. This section of mounting component 102 which runs in Z-direction can be the same one that is also used to connect with longitudinal member 104, as depicted in FIG. 1.

An elastic section 128 is arranged on the socket formed by fasteners 118. This elastic section 128 can be made of rubber or another elastic medium. Elastic section 128 can be in the shape of a parallelogram, as depicted in FIG. 1. For example, the parallelogram formed by elastic section 128 has an upper parallelogram leg 130, which essentially runs in X-direction. Second fasteners 132 are designed on upper parallelogram leg 130 in this embodiment. In this case, it can be a snap-in hook or an internal screw thread, for example.

The fastening point defined by second fastener 132 can be moved in X, Y or Z-direction due to elastic section 128, to facilitate a compensatory tolerance.

Headlight unit 106 has a first, inside side 134 and a second, outside side 136. Headlight unit 106 also has a diffusing lens 138.

A fastener 140 is arranged on first side 134. In the embodiment under consideration here, fastener 140 is designed as projection 142 with an opening 144.

If opening 144 is positioned over the internal screw thread of fastener 132, a bolt can be guided through opening 144 into the internal screw thread in order to bolt it down. Alternatively, fasteners 132 and 140 can be designed to form a removable snap-in connection, such as a plastic snap-in hook.

Positioning instruments 146 are arranged on side 136 of headlight unit 106. With respect to positioning instruments 146, the embodiment being considered here pertains to two projections 148 and 150 formed on diffusing lens 138, which each have an opening 152.

One positioning peg 154 or 156 can be guided through openings 152 respectively. The positioning pegs can be arranged in a fender area 158 of the motor vehicle. Positioning pegs 154 and 156 become narrower at their respective free ends. By introducing positioning pegs 154 and 156 into respective openings 152, headlight unit 106 becomes aligned relative to fender area 158.

Proceed as follows to preassemble front unit 100:

Headlight unit 106 is loosely connected to elastic element 116 by establishing a screw connection through fasteners 132 and 144, for example. The bolt is not tightened down, so that the elastic element and headlight unit 106 remain movable relative to one another. Since elastic element 116 is malleable, the bolt can also be tightened down, since a compensatory tolerance is also possible here.

Headlight unit 106 is then hung on mounting component 102 together with elastic element 116. To this end, for example, a loose screw connection is established by rotating a bolt through opening 112 into internal screw thread 114. This bolt is not tightened down so as to allow for relative movement of headlight unit 106 with respect to mounting component 102.

The front unit preassembled in this way is then conveyed to the motor vehicle body shell. First, mounting component 102 is fastened to a chassis of the motor vehicle, such as on longitudinal members 104 of the motor vehicle as depicted in FIG. 1. During assembly of front unit 100, headlight unit 106 is aligned with the motor vehicle body shell with the aid of positioning pegs 154 and 156 relative to the motor vehicle body shell, by guiding positioning pegs 154 and 156 through openings 152.

In the position it thereby assumes, headlight unit 106 is then fastened to elastic element 116 by, for example, tightening down the bolt which is previously guided through opening 144 into the internal screw thread of fasteners 132.

Preferably, before positioning headlight unit 106, elastic element 116 has already been attached to mounting component 102 with the aid of fastener 118, for example by tightening down the bolts which run through openings 120 and 122 into respective internal screw threads 124 and 126. The latter can also take place during preassembly of the front unit.

It is of particular advantage in this embodiment to ensure that the weight of headlight unit 106 is essentially absorbed by mounting component 102. Since we are dealing with a stable part here, the familiar headlight quivering can be avoided. Also of particular advantage is the fact that a separate holding component for headlight unit 106 is not required to absorb its weight, which saves a considerable amount of installation space.

Of further particular advantage is the easy disassembly of headlight unit 106. One need only loosen the bolts running through openings 144 and 112, so that headlight unit 106 can then be taken out. Of particular advantage here is the fact that internal screw thread 132 is designed on upper parallelogram leg 130, so that it is easily accessible from above when the hood is open, in order to unscrew or screw in the bolt running through opening 144. This advantage is also evident if instead of a screw connection, a snap-in connection is selected for connecting the elastic element to side 134, since then, for example, a corresponding snap-in hook is easily accessible from above in order to loosen it.

Figure 2:
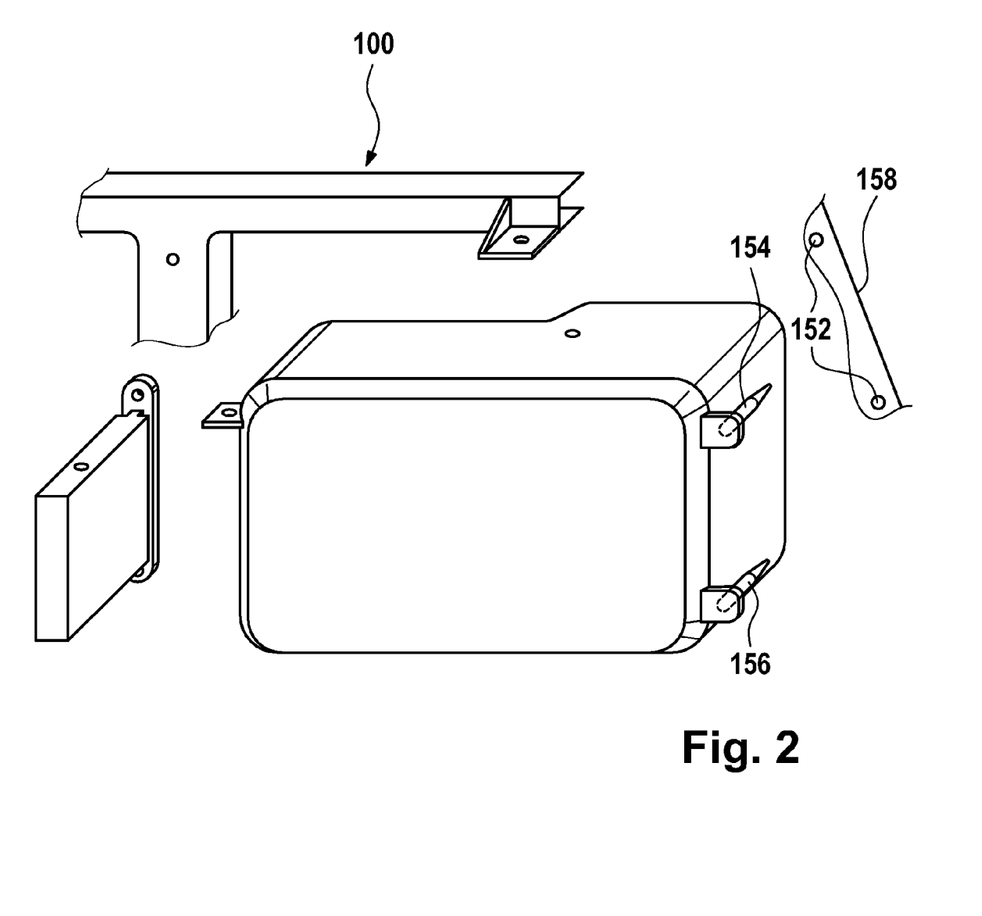
FIG. 2 is a perspective view of another embodiment of a front unit according to the invention.

FIG. 2 shows an alternative embodiment of front unit 100, where the positioning pegs are not arranged in fender area 158 of the motor vehicle, but rather at projections 148 or 150. In this embodiment, openings 152 are arranged in fender area 158. To align headlight unit 106, positioning pegs 154 and 156 are inserted in openings 152 so that headlight unit 106 is aligned relative to the motor vehicle body shell.

Figure 3:
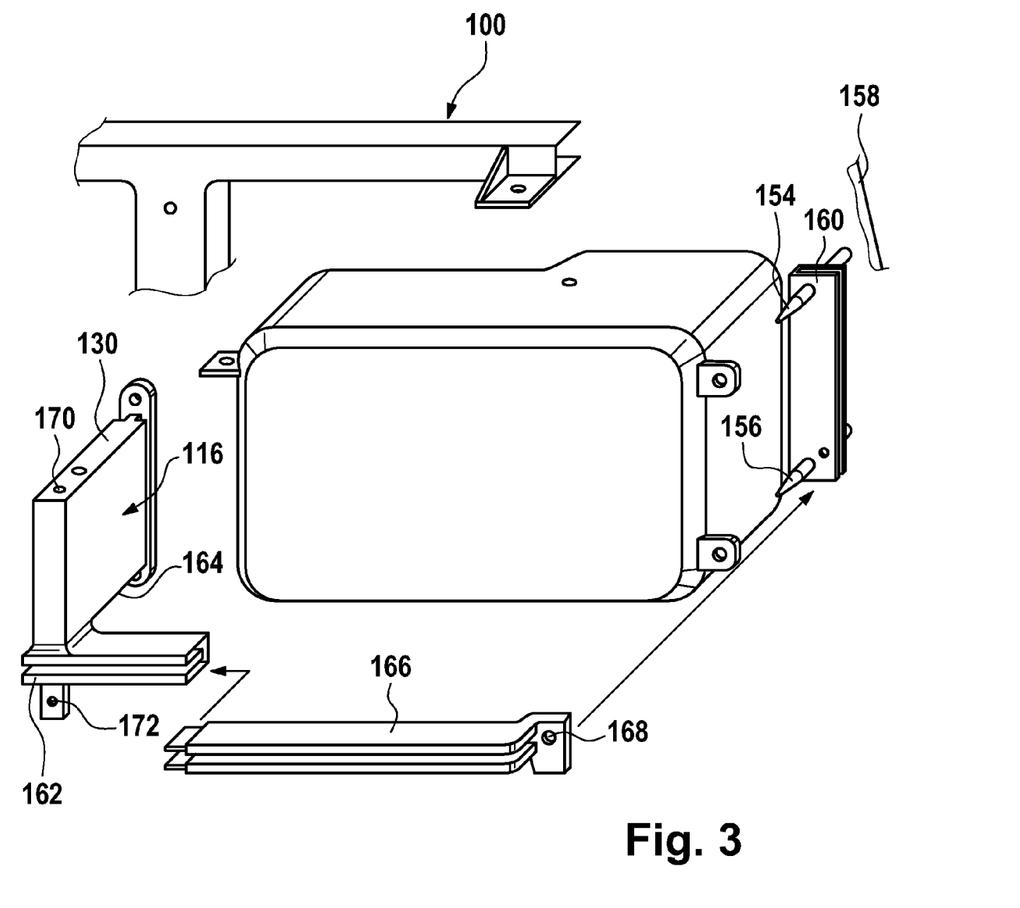
FIG. 3 is a perspective view of another embodiment of a front unit according to the invention.

FIG. 3 shows another embodiment of front unit 100 with a separate positioning component 160. Positioning component 160 is designed to be attached to fender area 158 of the motor vehicle, by a screw or snap-in connection for example. Positioning component 160 carries positioning pegs 154 and 156.

Positioning component 160 can also be designed so that it can be detachably connected to headlight unit 106 for the preassembly. For example, positioning component 160 can be detachably connected to side 136 of headlight unit 106 during preassembly using a bar or a snap-in connection. During final assembly, positioning component 160 is then loosened from headlight unit 106 and for the time being attached to fender area 158. Subsequently, openings 152 of headlight unit 106 are inserted in positioning pegs 154 and 156, by means of which headlight unit 106 is aligned.

In the embodiment being considered here, elastic element 116 has third fasteners 162, which in the embodiment under consideration here are arranged on lower parallelogram leg 164, which is located opposite parallelogram leg 130.

Fasteners 162 are designed for fitting a holding component 166, which is used to hold a bumper cover of a bumper from the motor vehicle front unit. Holding component 166 is therefore not used to attach headlight 106, since it is actually suspended on mounting component 102. Holding component 166 can be designed to be respectively fragile, since the weight of the bumper cover is quite light.

Holding component 166 has an opening 168 at its exterior end. During final assembly, positioning peg 156 is conveyed through opening 168, and the other end of holding component 166 is fitted to fastener 162 of elastic element 116. Holding component 166 is hereby aligned with reference to headlight unit 106 and with reference to the body of the motor vehicle, which can result in a high-quality joint pattern.

One or more additional fasteners can be provided on elastic element 116, in particular to attach the bumper cover. In the embodiment being considered here, a fastener 170 for producing a screw or snap-in connection on upper parallelogram leg 130 is arranged in front of fastener 132 in the direction of travel. Fastener 170 can be realized, for example, by an internal screw thread for screwing in a bolt or by a snap-in hook for forming a snap connection with the bumper cover.

After assembly of holding component 166, the bumper cover is attached to front unit 100, specifically with the aid of fasteners 170, among other things. Of particular advantage here is the fact that fasteners 140 remain accessible, so that the headlight unit can be easily dismantled for maintenance and repair purposes. This is accomplished by loosening fasteners 132, 144 as well as the hanger assembly of headlight 106 at mounting component 102, by loosening the bolt running through opening 112, for example.

Elastic element 116 can feature additional fasteners 172, to fix the elastic element in its deformation position assumed by the positioning of headlight unit 106, which will be explained in more detail with reference to FIG. 6.

Figure 4:
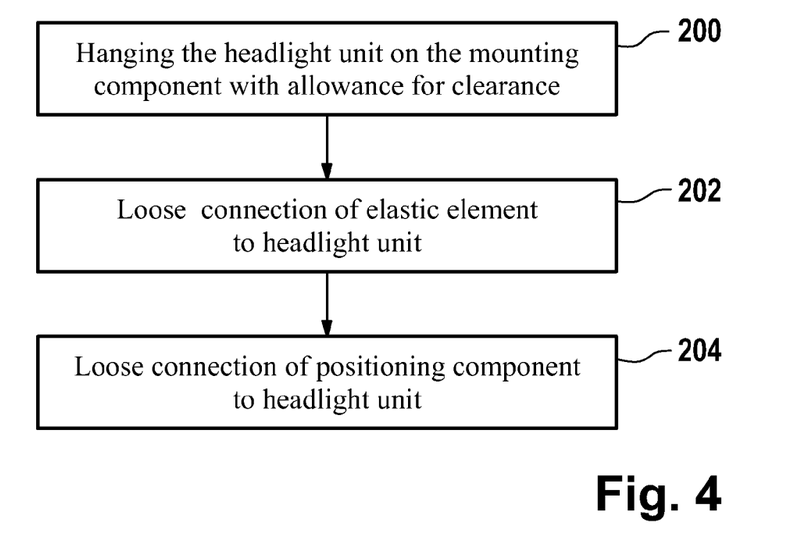
FIG. 4 is a flow chart of an embodiment of a procedure for preassembly according to the invention.

FIG. 4 shows a flow chart of a procedure for preassembly of the front unit. In step 200, the headlight unit is suspended on the mounting component of the front unit with some play. This can be done using a screw or snap-in connection. In step 202, the elastic element (see also elastic element 116 of FIGS. 1 to 3) is connected to the headlight unit. In one embodiment with a separate positioning component (see also embodiment of FIG. 3), the positioning component can be detachably connected to the headlight unit in step 204.

Figure 5:
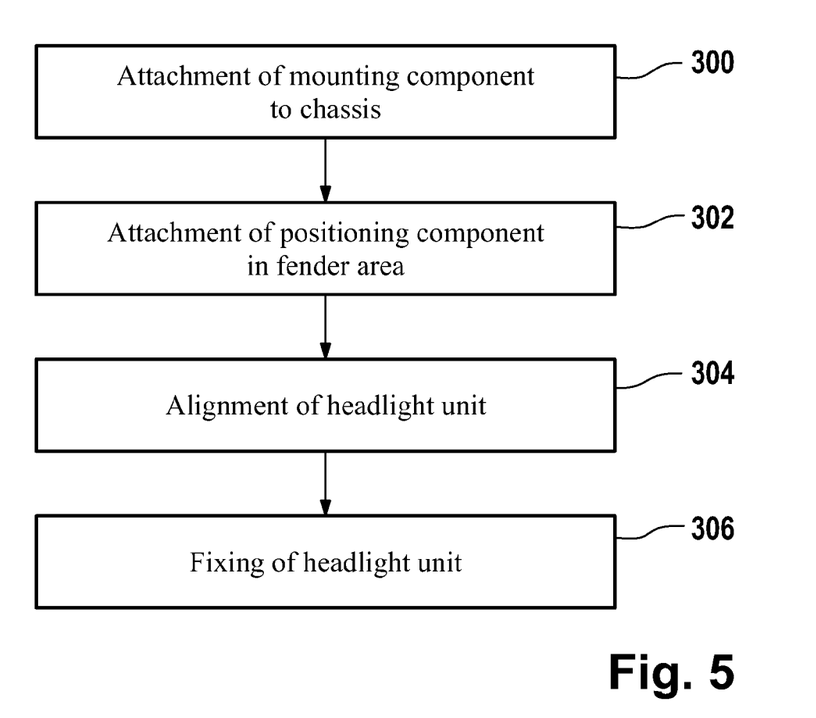
FIG. 5 is a flow chart of an embodiment of a procedure for assembly according to the invention.

The front unit preassembled in this way can be delivered to the motor vehicle manufacturer by the subcontractor who manufactures the front unit for mounting on a motor vehicle. In this case, the mounting component is first connected to the motor vehicle body shell, specifically the chassis, in step 300. This can be done in such a way that the mounting component is attached to the longitudinal members of the motor vehicle. In one embodiment with a separate positioning component, this can be detached by the headlight unit and mounted in the fender area of the motor vehicle. Respective assembly openings can be located in the fender area for this purpose.

In step 304, the headlight unit is aligned relative to the fender area with the aid of the positioning instruments, for example the positioning pegs. In the position thereby assumed, the headlight unit is fixed in step 306. This can take place in such a way that the elastic element is fixed in the position assumed by the positioning of the headlight unit. This positioning of the headlight unit can be automatic, if the front unit is joined to the motor vehicle body shell by bringing the headlight unit into its target position, by means of the positioning pegs for example, if the positioning pegs slide by means of respective openings as the front unit is joined to the motor vehicle body shell (see also openings 152 in the embodiments of FIGS. 1, 2 and 3).

In the embodiment of FIG. 3 this can take place in such a way that elastic element 116 is fixed relative to the motor vehicle body shell or to mounting component 102 with the aid of its fastener 172, by forming a screw connection through the opening of fastener 172, for example, e.g. a bolt is guided through the opening and perhaps screwed directly to mounting component 102 or to another fixed structural component relative to this mounting component 102.

Figure 6:
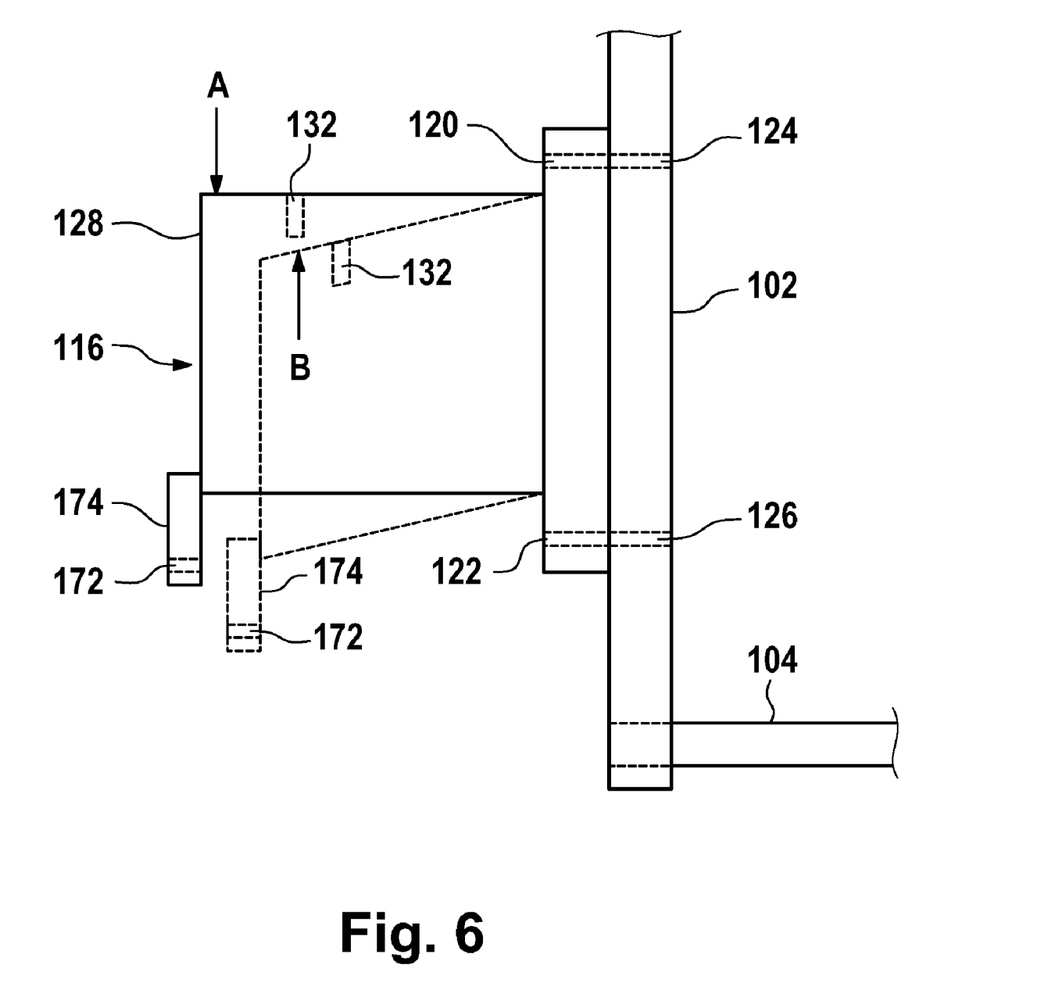
FIG. 6 is a schematic lateral view for depicting the starting position and the deformation position of the elastic element.

FIG. 6 shows a partial view of FIG. 3, in which elastic element 116 is shown in its starting position A with solid lines and in its assumed position B after positioning of headlight unit 106 with dotted lines.

Before positioning headlight unit 106 with the aid of positioning pegs 154, 156, elastic element 106 is fastened to mounting component 102, specifically in the screw connections formed by openings 120, 122 or internal screw threads 124, 126 respectively.

Due to the positioning, headlight unit 106 exerts a force on elastic element 116, for example via fastener 132, so that it deforms to position B as shown in FIG. 6. In this position, elastic element 116 is fixed by means of fastener 172, in that a bolt, for example, is screwed into a structural component of the front unit, which is fixed relative to mounting component 102.

The right side of front unit 100 can be conceived in accordance with the left side depicted in the above figures.

LIST OF REFERENCE MARKS

100 Front unit
102 Mounting component
104 Longitudinal member
106 Headlight unit
108 Hanger assembly
110 Projection
112 Opening
114 Internal screw thread
116 Elastic element
118 Fastener
120 Opening
122 Opening
124 Internal screw thread
126 Internal screw thread
128 Elastic section
130 Parallelogram leg
132 Fastener
134 Side
136 Side
138 Diffusing lens
140 Fastener
142 Projection
144 Opening
146 Positioning instrument
148 Projection
150 Projection
152 Opening
154 Positioning peg
156 Positioning peg
158 Fender area
160 Positioning component
162 Fastener
164 Lower parallelogram leg
166 Holding component
168 Opening
170 Fastener
172 Fastener

The invention claimed is:

1. A front unit for a motor vehicle, comprising:
at least one headlight unit,
a mounting component for connecting with the motor vehicle,
means for hanging the headlight unit on the mounting component, wherein the means for hanging the headlight unit is operable such that the headlight unit upon attachment to the means for hanging, can be moved and rotated relative to the mounting component when the front unit is in a preassembled state,
an elastic element with a first fastener for fastening relative to the mounting component and a second fastener for fastening to a first vertical side of the headlight unit,
positioning pegs for positioning a second side of the headlight unit located opposite the first side relative to a fender area of the motor vehicle, and
a holding component for a bumper cover, wherein the elastic element includes a third fastener for the holding component, wherein the holding component extends along a lower, horizontal side of the headlight unit and includes an opening to accept one of the positioning pegs.

2. The front unit of claim 1, wherein the elastic element is shaped as a parallelogram.

3. The front unit of claim 2, wherein the second fastener is arranged on an upper parallelogram leg of the elastic element.

4. The front unit of claim 2, wherein the elastic element is a solid element with at least two faces, wherein each of the two faces are shaped as a parallelogram.

5. The front unit of claim 1, further comprising means for fixing the elastic element in its position assumed by positioning of the headlight unit.

6. The front unit of claim 1, wherein the positioning means includes at least one positioning peg.

7. The front unit of claim 6, wherein the positioning peg is arranged on the headlight unit.

8. The front unit of claim 7, wherein the positioning peg is arranged on a diffusing lens of the headlight unit.

9. The front unit of claim 1, further comprising a positioning component for attaching to a fender area of the motor vehicle.

10. The front unit of claim 9, wherein the positioning component is detachably connectable to the headlight unit.

11. The front unit of claim 1, wherein the holding component is designed for connecting to the positioning means.

12. The front unit of claim 1, wherein the elastic element includes a fourth fastener for fastening a bumper cover, wherein the fourth fastener is arranged in front of the second fastener, so that the second fastener remain accessible when the bumper cover is installed.

13. A method for preassembly of a front unit for a motor vehicle, comprising:
    suspending by hanging a headlight unit on a mounting component by means of a fastener such that the headlight unit can be moved and rotated relative to the mounting component upon the suspension,
    fastening an elastic element to the mounting component by means of a first fastener included on the elastic element,
    fastening the elastic element on a first vertical side of the headlight unit by means of a second fastener of the elastic element,
    detachably connecting a positioning peg to a second side of the headlight unit located opposite the first side relative to a fender area of the motor vehicle,
    attaching the mounting component to the motor vehicle,
    positioning the headlight unit by means of the positioning peg relative to the fender area of the motor vehicle and fixing the elastic element,
    and
    installing a holding component for a bumper cover along a lower, horizontal side of the headlight unit by means of a third fastener and the positioning peg, wherein the elastic element includes the third fastener for the holding component and the holding component includes an opening to accept the positioning peg.

14. The method of claim 13, wherein a positioning component is detachably connected to a second side of the headlight unit.

15. The method of claim 14, further comprising:
    attaching the mounting component to the motor vehicle,
    positioning the headlight unit by means of the positioning component relative to a fender area of the motor vehicle, and
    fixing the elastic element.

16. The method of claim 13, wherein the bumper cover is mounted with a fourth fastener and the holding component, so that the second fastener remains accessible.

17. A motor vehicle including at least one front unit that comprises:
    at least one headlight unit,
    a mounting component for connecting with the motor vehicle,
    means for hanging the headlight unit on the mounting component, wherein the means for hanging the headlight unit is operable such that the headlight unit upon attachment to the means for hanging, can be moved and rotated relative to the mounting component when the front unit is in a preassembled state,
    an elastic element with a first fastener for fastening relative to the mounting component and a second fastener for fastening to a first vertical side of the headlight unit,
    positioning pegs for positioning a second side of the headlight unit located opposite the first side relative to a fender area of the motor vehicle, and
    a holding component for a bumper cover, wherein the elastic element includes a third fastener for the holding component, wherein the holding component extends along a lower, horizontal side of the headlight unit and includes an opening to accept one of the positioning pegs.

* * * * *